INVENTOR.
WILLIAM H. ROBINSON
ATTORNEYS

United States Patent Office 3,526,311
Patented Sept. 1, 1970

3,526,311
APPARATUS FOR ORIENTING CLOSURE CAPS AND THE LIKE
William H. Robinson, New Vienna, Ohio 45159
Continuation-in-part of application Ser. No. 778,441, Nov. 25, 1968, which is a continuation-in-part of application Ser. No. 483,252, Aug. 27, 1965. This application July 3, 1969, Ser. No. 838,748
Int. Cl. B65g 15/14, 47/24
U.S. Cl. 198—33                                10 Claims

ABSTRACT OF THE DISCLOSURE

From an initial position in which the open sides of dished articles may be facing in either one of opposite directions, the articles are fed successively between two moving surfaces. One of the surfaces urges the articles toward the other surface which moves the individual articles along a preselected path by frictional engagement at two discrete locations spaced apart along the edge of the open side of each article. As the articles are thus moved along said path they are simultaneously turned from their initial position to a desired position in which the open sides of all articles face in a desired direction.

---

This application is a continuation-in-part of U.S. application Ser. No. 778,441, filed Nov. 25, 1968, now pending and which, in turn, was a continuation-in-part of U.S. application Ser. No. 483,252, filed Aug. 27, 1965, and now abandoned.

BACKGROUND

The present invention relates to improvements in apparatus for capping containers and the like and, more particularly, to mechanically simple and reliable apparatus operable at high speeds for unscrambling a haphazard mass of articles which are dished or recessed and form an open side, such as closure caps, and positively orienting said articles and delivering the same in a single desired position for a subsequent operation. The above-noted applications for patent relate to a method and means for unscrambling, and positively and reliably orienting such dished articles, and particularly plastic flexible closures, to a desired oriented position at high rates of speed which were unattainable prior to the inventions disclosed in said above-noted applications for patent.

However, such high speed operation, while very desirable, at least in some instances presents another type of problem. At the high rates of speed desired in capping operations, the rapid movement of the closure caps together with frictional engagement thereof with certain surfaces of the apparatus may result in scratching, marring, or other damage to surfaces of the closure caps and in the occasional jamming and/or overlapping of flexible closures within passageways. With flexible caps of material such as polyethylene, such problems are even more difficult because polyethylene has a high coefficient of friction in sliding contact with itself and other materials and is relatively soft and has low resistance to scratching, marring, etc. Accordingly, a principal object of the present invention is to provide improved apparatus for positively and reliably orienting dished articles to a desired oriented position at high rates of speed without damaging the surfaces of such articles.

SUMMARY

In accordance with the present invention, feeding an orienting of articles is accomplished, and interference by or between articles and/or scratching or marring thereof is avoided, by positioning, orienting, conveying, and controlling each article individually during its movement through the orienter device, and by avoiding relative movement between contacting surfaces.

DESCRIPTION

The foregoing, as well as additional objects and advantages of the invention will become apparent from the following disclosure taken in conjunction with the accompanying drawings in which.

The present invention is well suited to be embodied in apparatus of the type disclosed in my above-mentioned prior patent applications. Such apparatus includes an unscrambling device which receives articles which may be dished and form an open side such as closure caps from a hopper. The unscrambling device arranges the articles in edge-to-edge relation and discharges them into a suitable passageway through which a succession of articles is fed to an orienting device. As the articles are fed in edge-to-edge relation into the orienting device, the open sides of some of the articles will face in one direction while the open sides of other articles will face in the opposite direction. As the articles pass through the orienting device, they are individually oriented to a desired common position during their movement through the device and are then discharged onto a moving conveyor with the open sides of all such articles facing in one desired direction. Following such orientation, the articles are advanced to a subsequent work station. The foregoing general description of the entire apparatus is sufficient for an understanding of the present invention which will be illustrated and described herein by referring only to those structural details of the apparatus that are necessary for a proper understanding of the present invention.

Figure 1:
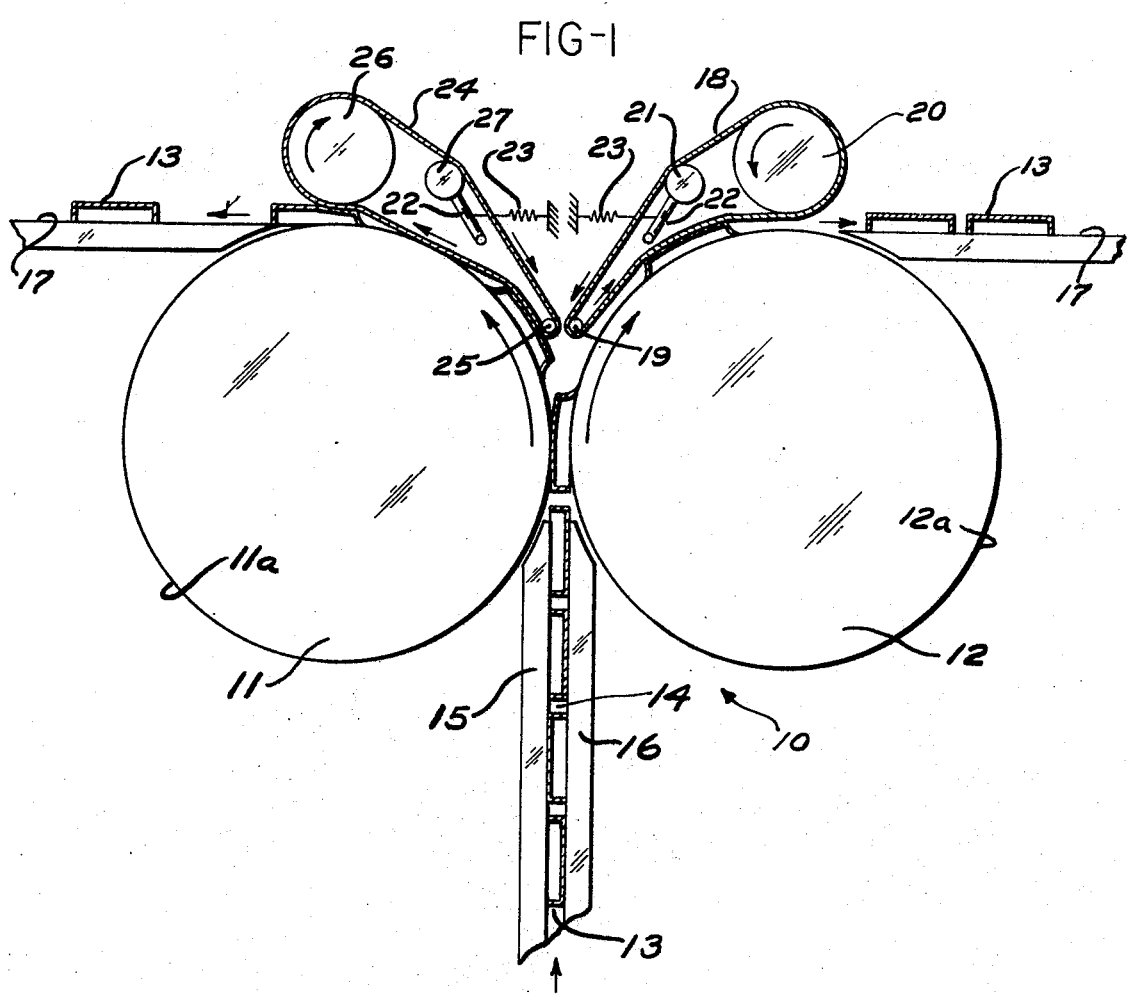
FIG. 1 is a diagrammatic view illustrating one embodiment of the present invention.

In FIG. 1 an orienter device 10 turns each of the dished articles individually to a desired oriented position in which the open sides of such articles all face in a desired direction. As illustrated, orienter device 10 comprises a pair of contra-rotating rolls 11, 12 having peripheral surfaces 11a, 12a that are spaced apart and form a nip therebetween through which the dished articles are fed upwardly. Dished articles such as closure caps 13 are successively fed into the nip between rolls 11, 12 through a passageway 14 between walls 15, 16. After passing through the orienting device, the articles 13 are discharged onto a surface 17 with the open sides of all of the articles facing downwardly.

The spacing between the peripheral surfaces 11a, 12a of the rolls is slightly less than the overall thickness of articles 13 so that as each such article passes through the nip a predetermined nip pressure is developed thereby. The pressure thus developed in the nip forces the open side of article 13 toward and into engagement with the peripheral surface of the roll that is adjacent said open side. The edge of said open side engages the peripheral surface of said roll at least two discrete spaced-apart locations. Accordingly, the open side of article 13 is caused to follow the peripheral surface of the roll with which it is so engaged as the article passes through the nip. Such article is thereby turned to the right or to the left, in FIG. 1, since the nip pressure holds it in contact with the peripheral surface of the particular roll with which the open side of the article is in contact. Additionally, said nip pressure establishes frictional contact with said peripheral surface at said two discrete locations so that each such article is positively driven through the nip and caused to follow said peripheral surface. While still under the control of nip pressure, the leading edge of the article is held in contact with said peripheral surface and is thereby fed into the space between said peripheral surface and belt 18 or 24, as the case may be.

After leaving the control of the nip, pressure provision is made for maintaining pressurized contact between said two discrete locations and the peripheral surface of the roll to insure that the article will follow said roll until the article has been fully turned to a desired common position and is ready for discharge from the orienter. This is accomplished in accordance with the present invention by the provision of an endless flexible belt 18 trained around a guide roll 19, driving roll 20, and takeup roll 21. Guide roll 19 is positioned adjacent the exit side of the nip so that, as an article 13 is turned during its passage through the nip, its leading edge is fed into the space between peripheral surface 12a and the moving belt 18. Driving roll 20 is similarly spaced from peripheral surface 12a adjacent the location at which articles 13 are discharged from the orienter onto a surface 17. The spacing between the peripheral surface 12a and the belt 18 as it is trained around guide roll 19 and also the spacing between peripheral surface 12a and the belt as it is trained around drive roll 20 approximately corresponds with the nip spacing so that the articles will be subjected to sufficient pressure to hold the articles in frictional driving contact with the peripheral surface 12a. The action of the takeup roll 21 provides sufficient belt tension so that belt 18 will exert such pressure as required for positive control of article 13 while it is between peripheral surface 12a and belt 18 and while it is moving between guide roll 19 and drive roll 20. If desired, takeup roll 21 may be mounted on an arm 22 and biased by a spring 23 in a direction to constantly provide a preselected tension to belt 18. Thus, the belt will remain under proper tension irrespective of whether or not an article 13 is interposed between belt 18 and peripheral surface 12a at any given time. Alternatively, belt 18 may be formed of resilient material.

Roll 12 and roll 20 are both interconnected to a suitable driving means such as a motor in a known manner as by gearing and/or belts and pulleys so that the surface speed of belt 18 corresponds substantially to that of the peripheral surface 12a. Accordingly, as article 13 passes between belt 18 and peripheral surface 12a, the tension of belt 18 holds the article in engagement with the peripheral surface 12a which causes the article to move with the motion of peripheral surface 12a. Since belt 18 is moving at substantially the same speed as surface 12a, there is no substantial relative movement between article 13 and belt 18 or peripheral surface 12a.

A corresponding belt 24 is trained around guide roll 25, drive roll 26 and takeup roll 27, all of which are similarly mounted and operate in a similar manner in connection with roll 11.

Figure 3:
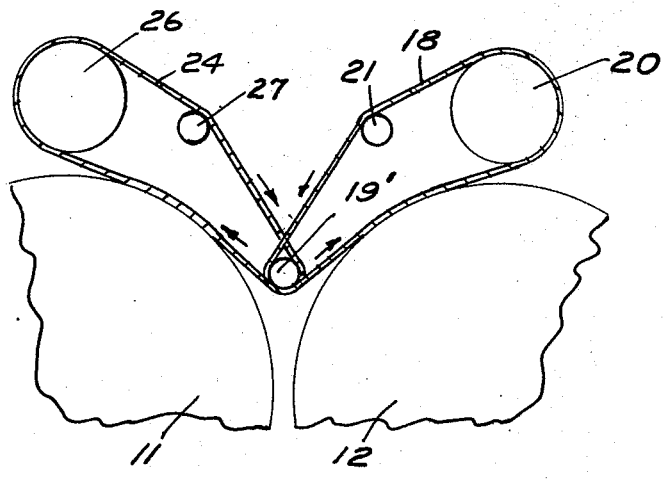
FIG. 3 is a modification of the embodiment of FIG. 1.

FIG. 3 shows a modification of the embodiment of FIG. 1.

In the modification shown in FIG. 3, like elements bear like designations, but differs in that belt 18 and belt 24 are relatively offset and both are trained around a single guide roll 19' adjacent the nip, and guide roll 25 is omitted.

Figure 2:
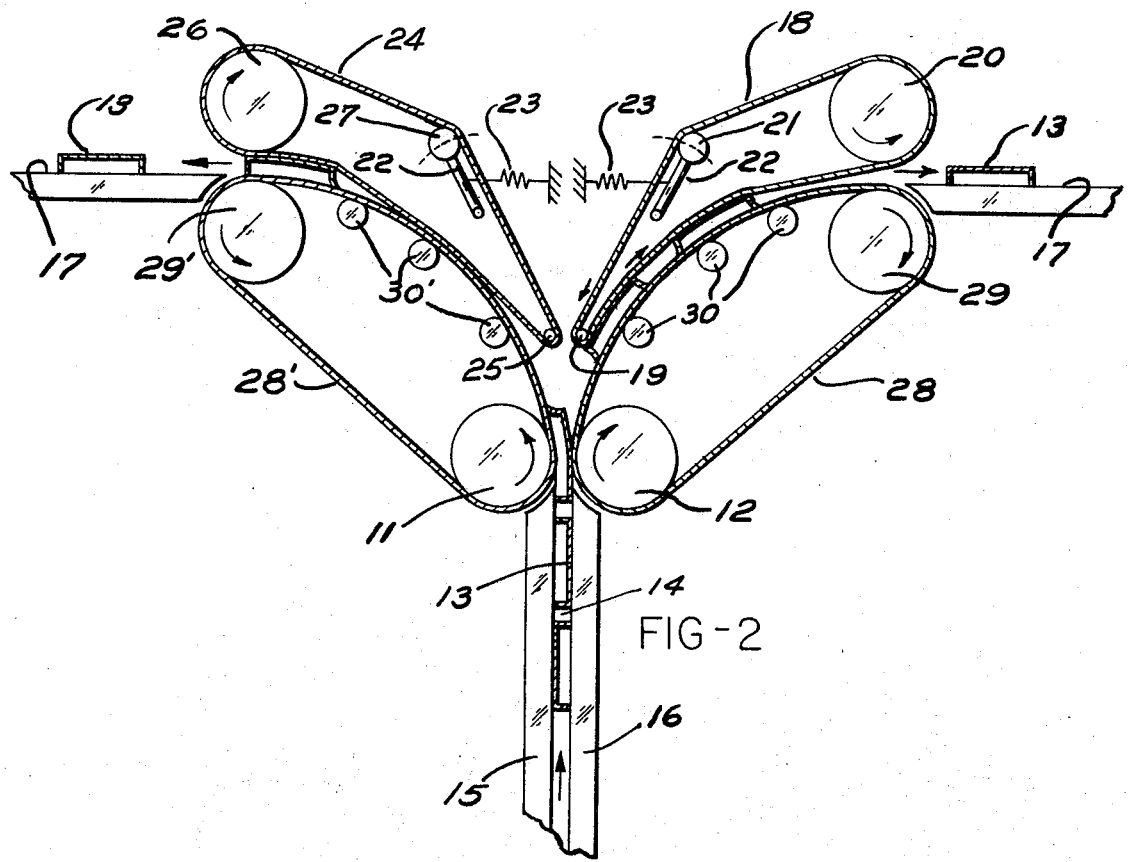
FIG. 2 is a diagrammatic view illustrating a modified embodiment of the invention.

In the modified embodiment of the invention illustrated in FIG. 2, like elements bear like designations. The embodiment of FIG. 2 differs from that of FIG. 1 by the addition of moving belts 28, 28' which are trained around roll 11, 12 and also roll 29, 29'. Within the space between roll 12 and roll 29 and beneath the upper reach of belt 28 there is provided a suitable supporting surface for the upper reach of belt 28. Such supporting surface may consist of a plurality of guide rolls 30. And in the above embodiment, the driving connection between roll 12 and roll 20 is such that the surface speed of belt 18 corresponds substantially to that of belt 28. Thus, in this embodiment, the belts 28, 28' thus perform the same function and in the same manner as the rolls 11, 12 of FIG. 1.

While particular embodiments of the invention have been illustrated and described, it will be obvious that various changes and modifications can be made without departing from the invention as defined in the appendant claims.

What is claimed is:

1. In an orienting device for automatically moving at high speed a plurality of dished articles from an initial position in which the dished sides of said articles may fall in either of opposite directions to a desired position in which all dished sides of all of said articles face in a desired direction by individually and successively passing said articles through a nip between a pair of moving surfaces and driving said articles along a preselected curvilinear path from said nip to said desired position by frictional engagement between one of said surfaces and two discrete spaced-apart locations along a marginal edge of a dished side of an individul article, the improvement comprising means at the exit side of said nip positively and individually driving said articles from said nip to said desired position along said path and avoiding surface damage to said articles and including flexible means moving in timed relation with the movement of said one surface resiliently biasing successive articles and maintaining said frictional driving engagement between said one moving surface and said two discrete locations during movement of an article along said path between said nip and said desired position.

2. Structure according to claim 1 wherein said flexible means is endless.

3. Structure according to claim 2 wherein said endless means is trained around a pair of spaced-apart rolls each spaced apart from said one surface.

4. Structure according to claim 3 wherein said endless means moves in the same general direction as said one surface while said endless means engages said individual article.

5. Structure according to claim 3 and additionally including yieldable means engaging and urging said endless means toward said one surface for maintaining the engagement between said one surface and said two discrete locations at the open side of said article.

6. Structure according to claim 3 wherein a second endless flexible means is trained around a second pair of spaced-apart rolls each spaced apart from the other moving surface.

7. In a device for orienting a succession of dished articles during their movement from an initial position in which the open sides of successive articles may face in either of opposite directions to a desired position with the open sides of all of said articles facing in a desired direction and wherein said articles are passed individually through the nip between a pair of contra-rotating rolls nad nip pressure urges the open side of an individual article toward one of said rolls, the improvement comprising a first endless flexible means trained around said one roll and moving away from the nip along a preselected path, a guide spaced from said first flexible moving means and adjacent said nip, a second endless flexible means trained around said guide and moving in timed relation with the speed of and in the general direction of movement of said first flexible moving means and gripping said articles between said first and second flexible means during movement of said article from said nip to said desired position.

8. Structure according to claim 7 and additionally including a support adjacent said first flexible moving means and defining said path.

9. Structure according to claim 7 wherein said first flexible moving means is additionally trained around a second guide adjacent said desired position.

10. Structure according to claim 7 and additionally including yieldable means urging said second flexible moving means toward said first flexible moving means for maintaining said gripping engagement.

References Cited

UNITED STATES PATENTS 3,123,198   3/1964   Hohl.

EDWARD A. SROKA, Primary Examiner

U.S. Cl. X.R.

198—165